United States Patent

Matthews

[15] 3,644,890

[45] Feb. 22, 1972

[54] OPTICAL CHARACTER RECOGNITION SYSTEM USING PARALLEL DIFFERENT SCAN SIGNAL PROCESSORS TO FEED HIGHER SPEED ASYNCHRONOUS RECOGNITION REGISTER

[72] Inventor: William J. Matthews, Glenside, Pa.

[73] Assignee: Philco-Ford Corporation, Philadelphia, Pa.

[22] Filed: Dec. 29, 1969

[21] Appl. No.: 888,455

[52] U.S. Cl. ..............................340/146.3 H, 340/146.3 AG
[51] Int. Cl. ..............................G06k 9/12
[58] Field of Search ..............................340/146.3

[56] References Cited

UNITED STATES PATENTS

| | | | |
|---|---|---|---|
| 3,234,513 | 2/1966 | Brust | 340/146.3 AG |
| 3,289,164 | 11/1966 | Rabinow | 340/146.3 H |
| 3,104,372 | 9/1963 | Rabinow et al. | 340/146.3 AG |

*Primary Examiner*—Maynard R. Wilbur
*Assistant Examiner*—William W. Cochran
*Attorney*—Herbert Epstein

[57] ABSTRACT

An Optical Character Recognition (OCR) system which scans a character to be recognized to produce a scanner output signal which feeds parallel different processors, the outputs of which are inspected sequentially in real time at a rate higher than the scan signal frequency by a recognition mask system. The parallel different processors derive from the scanner output signal a plurality of different though related output signals which in effect represent a plurality of scans of the character in different modes, thereby reducing the need to rescan nonstandard characters in such different modes. The parallel different processors utilize (1) bilevel quantizers with different threshold levels, thereby to provide a normalized binary signal for characters of nonstandard contrast, and (2) stacking shift registers, operating at different speeds, for receiving the outputs of the bilevel quantizers, thereby to provide a normalized binary signal for characters of nonstandard height. The information in the stacking registers, which store at any instant a part only of the scanner output signal, is periodically supplied, by parallel transmission, to respective groups of nonadjacent initial stages of a high-speed recognition register which operates asynchronously with the scanner and at a much higher speed than the scanner. A set of recognition masks, each designed to provide a maximum output in response to a signal representative of a particular character, is coupled to nonadjacent subsequent stages of the recognition register such that complete binary signals from the stacking register, representing differently processed versions of the scanner output signal, are inspected sequentially. In the course of this operation each mask inspects every binary signal. Identity of the scanned character is indicated by the mask which produces the highest output.

5 Claims, 7 Drawing Figures

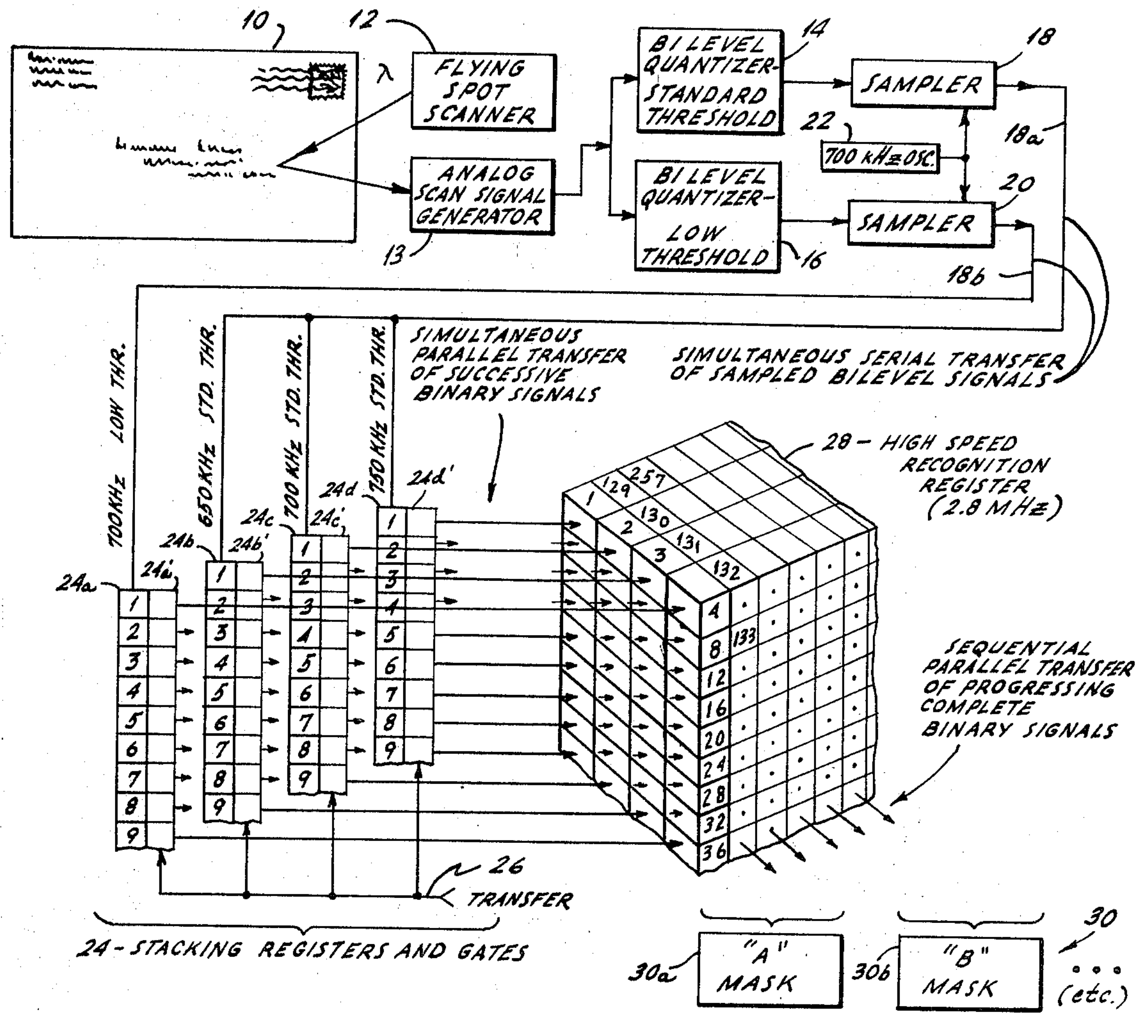
FIG. 1. - OCR SYSTEM
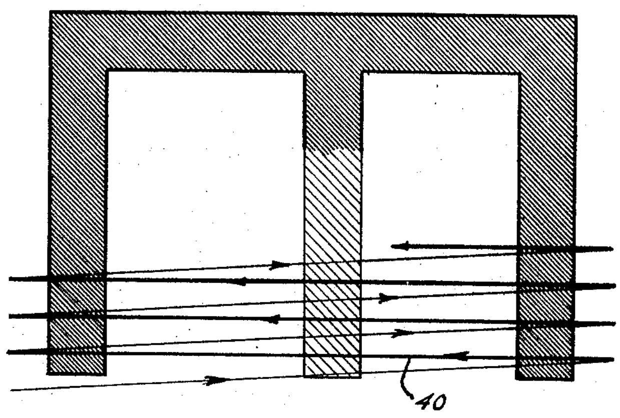
FIG. 2. SCANNING PATTERN
INVENTOR.
WILLIAM J. MATTHEWS
D. Gressman
ATTORNEY

FIG. 3.

PORTION OF ANALOG SCAN SIGNAL (GENERATED BY SCAN PATH 40 OF FIG. 2.)

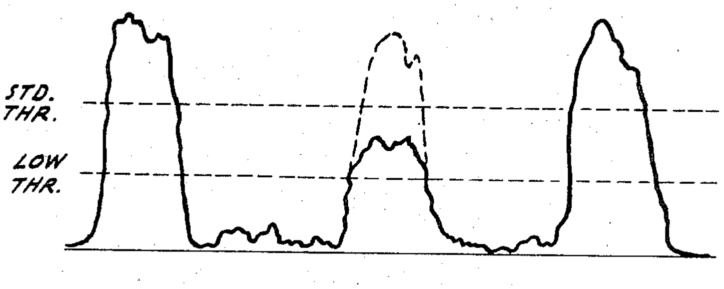

FIG. 4.

FIG. 3. SIGNAL BILEVEL QUANTIZED

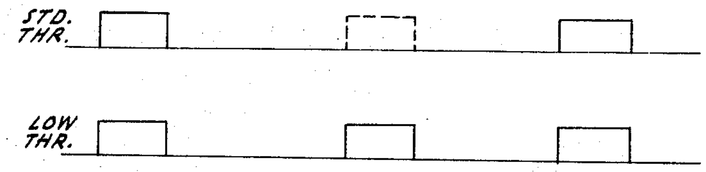

FIG. 5.

FIG. 4. PULSES SAMPLED

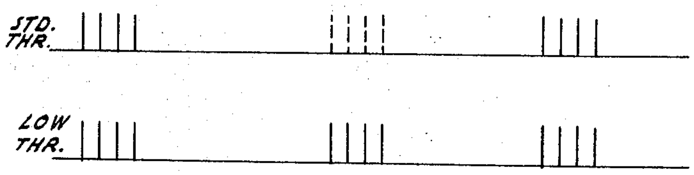

FIG. 6.

INFO. CONTENT OF STACKING REGISTERS AFTER RECEIPT OF FIG. 5. PULSES

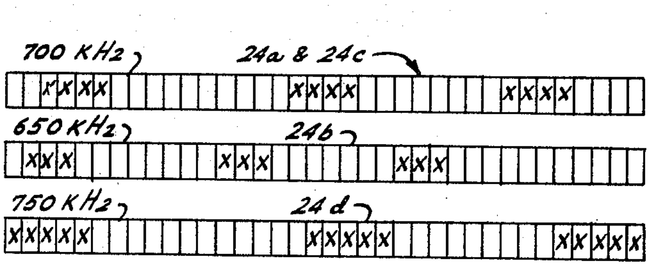

FIG. 7. SUCCESSIVE PATTERNS OF SET OUTPUT STAGES OF RECOGNITION REGISTER

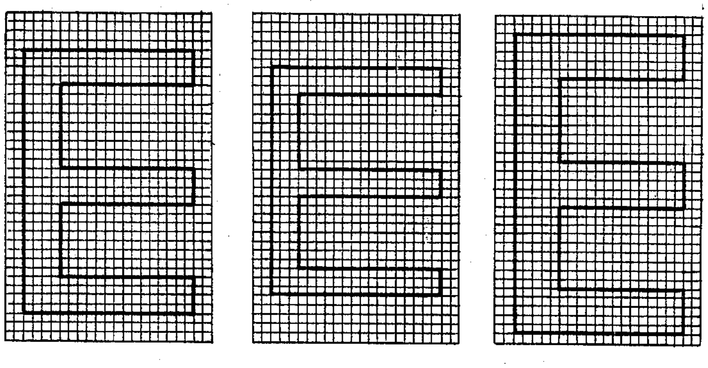

SIGNAL FROM REGISTER 24a & 24c

SIGNAL FROM REGISTER 24b

SIGNAL FROM REGISTER 24d

INVENTOR.
WILLIAM J. MATTHEWS

D. L. Freeman
ATTORNEY

OPTICAL CHARACTER RECOGNITION SYSTEM USING PARALLEL DIFFERENT SCAN SIGNAL PROCESSORS TO FEED HIGHER SPEED ASYNCHRONOUS RECOGNITION REGISTER

This invention relates to Optical Character Recognition (OCR) systems of the type which scan optically an area containing a character to be recognized and then determine the identity of the scanned character by analyzing the scanner output signal. In particular such systems identify the character by determining which one of a predetermined plurality of standard signal configurations, corresponding respectively to different characters, the current scanner output signal most resembles.

One difficulty associated with present OCR systems arises from the fact that some characters to be recognized, although shaped according to a known format, may have a nonstandard size or contrast, causing the character scanner to produce an output signal which cannot be recognized by the recognition circuitry. Heretofore this type of irregularity (size or contrast) was normalized by the scanner itself which, upon command of rescanning control means activated by circuits sensitive to the spurious scanner output signal, made one or more adjusted rescans in order to generate a "normal" scanner output signal from the character. Although this technique provides a method for recognizing nonstandard characters, it requires additional scanning time which slows appreciably the reading speed of OCR systems. Therefore it would be desirable to avoid or reduce the need to rescan a nonstandard character.

Accordingly several objects of the present invention are: (1) to provide an OCR system in which the need for rescanning a nonstandard character can be reduced greatly or obviated, depending on the quality of characters to be recognized, (2) to provide an OCR system with increased operating speed and greater accuracy, and (3) to provide an OCR system in which the need for a relatively complex rescan control means and adjustable scanning means can be reduced greatly or eliminated, depending on the quality of characters to be recognized. Other objects and advantages of the invention will become apparent from a consideration of the ensuing description thereof.

DRAWINGS

FIG. 1 shows a complete OCR system according to the invention.

FIG. 2 illustrates a scanning pattern which may be used in said system.

FIG. 3 shows a portion of the analog scan signal generated from the scanning pattern of FIG. 2.

FIG. 4 shows pulses produced by bilevel quantization at two different threshold levels of the waveform of FIG. 3.

FIG. 5 shows the pulses of FIG. 4 after sampling.

FIG. 6 illustrates the information content of the stacking registers of the OCR system upon receipt of the pulses of FIG. 5.

FIG. 7 shows patterns of successively set output stages of the recognition register of the OCR system of FIG. 1.

FIG. 1 - DESCRIPTION OF OCR SYSTEM

A document to be read, which for exemplary purposes is illustrated as a letter envelope containing an address, is illustrated at 10. The address of the envelope is scanned by a flying spot scanner 12, which causes a narrow light beam to scan each character of the address in a series of adjacent scan paths as illustrated in FIG. 2. A scan signal generator 13, comprising for example a photomultiplier tube, views the scanned characters to produce an analog scanner output signal whose amplitude varies in inverse proportion to the optical reflectivity along the path scanned. Further details of scanner 12 and generator 13 are discussed in U.S. Pat. No. 3,167,745 to Bryan et al., granted Jan. 26, 1965.

Each of a pair of bilevel quantizers 14 and 16 responds to the analog scan signal from generator 13 to generate a bilevel output signal which has a first value when the amplitude of the analog scan signal is above a certain threshold level and a second value when the amplitude of the analog scan signal is below said threshold level. Quantizer 14, which has a higher threshold level than quantizer 16, is designated hereinafter as having a "standard" threshold; quantizer 16 is designated hereinafter as having a "low" threshold. Each quantizer may comprise a standard amplitude selection circuit, such as a Schmitt trigger. While two quantizers are illustrated, more quantizers, each with a different threshold level, may be used if greater capacity to identify nonstandard characters is desired.

The outputs of the quantizers 14 and 16 are coupled, respectively, to a pair of samplers 18 and 20 which sample periodically the bilevel output signals from the quantizers at a rate determined by the frequency of the output signal from a driving oscillator 22, which has a frequency of 700 kHz. The sampled bilevel signals at the outputs of samplers 18 and 20 are transferred simultaneously, each by serial transmission, via conductors **18*a* and 18*b* respectively, to a bank of stacking registers and gates 24. The frequencies of the stacking registers and samplers are related as discussed infra. The operating frequency of samplers 18 and 20 is such that a given number of samples, equal to the number of stages in each stacking register (e.g., 32), are made during each scanning stroke (e.g., stroke 40 of FIG. 2) made by scanner 12. For this purpose, scanner 12 may be synchronized to oscillator 22** at the appropriate submultiple frequency.

The output of sampler 20 is coupled to a stacking register **24*a* which operates at 700 kHz. the frequency of oscillator 22. The output of sampler 18 is coupled to each of three further stacking registers 24*b*, 24*c*, and 24*d***, which operate at 650 kHz., 700 kHz., and 750 kHz. respectively. Each stacking register may be a standard serial input, parallel output shift register. The operating or shift signal for each register has been omitted to simplify the drawing.

Although four stacking registers are illustrated, more may be used if greater capacity to recognize nonstandard characters is desired. For example, more than one register may be connected to the output of sampler 20 and/or more than three registers may be connected to the output of sampler 18. The registers connected to the output of each sampler should operate at different frequencies, preferably at frequencies equal to, above, and below the frequency of sampler 18. The stacking registers do not have to be synchronized with sampler 18.

Associated with each stacking register is a multiple output gate for coupling, by parallel transmission upon command of a transfer pulse, the information stored in each register. Each multiple output gate may be a series of separate normally nontransmissive gates, each connected to a separate stage of the adjacent stacking register. Upon command of a transfer pulse supplied to lead 26, which is connected to every gate of every stacking register, all of the gates in each multiple output gate will be rendered transmissive, allowing the information stored in the stages of each stacking register to be coupled to the outputs of each register's multiple output gate by parallel transmission. The transfer pulse supplied to lead 26 occurs periodically, just after each time the bilevel signals from samplers 18 and 20 have reached the last stages of stacking registers **24*a* and 24*c*, respectively. For this purpose the transfer pulse may be synchronized with the shift pulses for registers 24*a* and 24*c*** at the appropriate submultiple frequency.

Each stacking register has s sufficient number of stages to accommodate the sampled bilevel signal supplied thereto generated during one scanning stroke of scanner 12, i.e., one scanning line such as line 40 shown in FIG. 2. For ease of illustration, only nine stages of each stacking register and its associated gate are illustrated, but in one preferred embodiment, each stacking register had 32 stages and an associated multiple output gate with 32 separate gates.

The outputs of the stacking register gates are coupled to respectively different input stages of a high-speed recognition shift register 28. Register 28 preferably is a standard serial input, parallel output shift register which operates at about four times the rate of oscillator 22, i.e., at about 2.8 MHz. Each shift of register 28 causes the information in every stage of register 28 to be shifted to the next higher numbered stage thereof. Although for clarity and ease of illustration, only a sufficient number of stages of register 28 to indicate its numbering sequence and input/output connections are illustrated, register 28 actually must contain a sufficient number of stages to store simultaneously all four signals provided by the stacking registers resulting from scansion of a single character area, i.e., all four signals produced by all of the scanning strokes, such as stroke 40 of FIG. 2, for a single character area. In the example given with 4 stacking registers of 32 stages each, when 19 scan paths (such as path 40 of FIG. 2) are required to scan a character area, recognition register 28 will have 4×32×19 or 2,432 stages. For ease of illustration and explanation, register 28 is shown as a three dimensional stack, which, if shown completely would be 32 stages high, 19 stages wide and (as shown completely) 4 stages deep. However in a practical embodiment register 28 usually will be formed of one or more integrated microcircuits, each comprising a two dimensional array of stages.

The driving or shift signal and its input connections to the stages of recognition register 28 are not illustrated, but such signal preferably has a frequency four times the nominal frequency (700 kHz.) of the stacking registers and does not have to be synchronized therewith.

The outputs of the stacking register gates are connected to the input stages of recognition register 28 as follows: The outputs of stacking register gate 24*d'* are connected to every fourth stage of register 28 beginning with stage 1, i.e., to stages 1, 5, 9, etc.; the outputs of gate 24*c'* are connected to every fourth stage of register 28 beginning with stage 2, i.e., to stages 2, 6, 10, etc.; the outputs of gate 24*b'* are connected to every fourth stage of register 28 beginning with stage 3, i.e., to stages 3, 7, 11, etc., and the outputs of gate 24*a'* are connected to every fourth stage of register 28 beginning with stage 4, i.e., to stages 4, 8, 12, etc. Thus the outputs of each stacking register are connected, via the stacking register gates, to every $n^{th}$ stage of recognition register 28, where $n$ is the number of stacking registers. Stated in other terms, the outputs of each stacking register are connected, via the stacking register gates, to an exclusive group of numerically nonadjacent initial stages of register 28.

The output stages of register 28 are numerically nonadjacent stages just subsequent to the input stages, which also are $n$ stages apart, where $n$ is the number of stacking registers. These stages are those in the right-hand face of register 28 as shown in the drawing, excluding the first column of stages.

A series of character recognition masks 30*a*, 30*b*, etc., each representing a separate character, are connected to the outputs of the recognition register. Each mask is connected to selected output stages of the recognition register and each mask typically comprises a plurality of resistors weighted to produce a maximum output signal when a signal representative of its associated character is received. Further details of the recognition masks are discussed in the aforementioned Bryan et al. U.S. Pat. No. 3,167,445.

The output of each mask may be connected to a threshold circuit designed to pass only signals above a predetermined level. The outputs of the threshold circuits are coupled to combinational logic circuitry which processes document 10 according to the information read thereon. For example when document 10 is a letter, and numerical postal area (ZIP) codes thereon are read, the combinational logic may be constructed and arranged to direct the letter to appropriate mail pouches destined for an appropriate postal area.

OPERATION

Assume that scanner 12 scans the letter "E." The scanning pattern is illustrated in FIG. 2; the heavy horizontal lines represent the actual path of the light beam and the lighter diagonal lines represent rapid retrace strokes when the scanning beam is blanked.

The analog scanner output signal produced by generator 13 during one scan of the three arms of the "E" is illustrated in FIG. 3. If the center arm of the "E" has a relatively light-type face (low contrast) as illustrated, the resultant scan signal will be as illustrated by the solid line in FIG. 3, i.e., the center pulse has a relatively low amplitude in relation to the outer pulses due to the relatively low contrast of the center arm. If the center arm of the "E" had a relatively high contrast similar to that of the outer arms, the center pulse of the analog scan signal would be as illustrated by the broken line of FIG. 3, i.e., approximately the same height as the outer two pulses.

FIG. 3 also illustrates the threshold levels of the standard bilevel quantizer 14 and the low-threshold bilevel quantizer 6. The standard threshold level of quantizer 14, which is designed for a normal, high-contrast type face, is above the height of the solid line center pulse of the scan signal, whereas the low-threshold level of quantizer 16 is below the height of the solid line center pulse.

The outputs of quantizers 14 and 16 are illustrated in FIG. 4. If the center arm of the "E" has low contrast as illustrated, the output of quantizer 14, labeled "Std. Thr.," will be two widely spaced pulses (illustrated in solid lines), representing a response by quantizer 14 solely to the traversal by the scanning beam of light of the high-contrast outer arms of the "E," and no response to the traversal by the light beam of the low-contrast center arm of the "E."

However if the center arm of the "E" had sufficient contrast to cause generator 13 to produce an analog scan signal with a high-center pulse as illustrated by the broken line pulse in FIG. 3, the output of quantizer 14 also would include a third center pulse as illustrated by the broken lined pulse of FIG. 4. In either case, the output of low-threshold quantizer 16, labeled "Low Thr.," will consist of three pulses. Thus quantizer 16, although more susceptible to spurious low-level input signals ("noise"), can produce, in response to the scanner output signal from a character or portion of a character having less contrast, a bilevel signal identical to that which quantizer 14 would produce from a character or portion of a character having normal contrast.

The bilevel quantized signals of FIG. 4 are broken into bursts of shorter pulses by samplers 18 and 20, as illustrated in FIG. 5. The center group of pulses are pulses in the "Std. Thr." waveform of FIG. 5, representing the output of sampler 18, are illustrated in broken lines in order to show that these pulses would be absent if the center arm of the "E" had less contrast. For purposes of illustration, it will hereafter be assumed that the centerline of the "E" does in fact have as much contrast as the outer arms so that the pulses illustrated by broken lines in FIGS. 3, 4, and 5 will be fact be present.

The complete signal from sampler 20, which consists of groups of pulses occurring at 700 kHz. and spaces between, ahead of, and behind such groups, is supplied to a 700 kHz. stacking register 24*a*. When the signal from sampler 20 fills register 24*a* (i.e., progresses to the last stage of register 24*a*, even though it does not necessarily set the last stage thereof) the stages of register 24*a* will be set symmetrically as illustrated by the 700 kHz. block of FIG. 6. It can be seen that the physical pattern of set stages in the stacking register 24 conforms directly with the time displayed pattern of pulses in the "Low Thr." signal of FIG. 5. Similarly, the output of sampler 18 also will set the stages of the 700 kHz. stacking register 24*c* (assuming the centerline of the "E" has high contrast) in the same manner as register 24*a* is set, i.e., according to the pattern illustrated by the 700 kHz. block of FIG. 6.

Due to the lower speed of operation of stacking register 24*b*, i.e., 650 kHz. instead of 700 kHz., the groups of pulses from the output of sampler 18 will progress through the 650 kHz. stacking register 24*b* at a slower rate than they did through the 700 kHz. register 24*c*. Thus, as indicated in FIG. 6, by the time the 700 kHz. registers 24*a* and 24*c* are filled, the 650 kHz. register 24*b* will be only partially filled, i.e., the pulses and spaces will not have progressed to the last stage of register 24*b*. Also since the 650 kHz. register 24*b* operates at a slower rate than the repetition rate of its 700 kHz. input signal, register 24*b* will resample the pulses of its input signal such that each burst of pulses of the input signal will set fewer stages than the number of pulses in a burst. Thus as illustrated in FIG. 6, the 650 kHz. shift register effectively stores a signal representative of scansion of a vertically compressed version of the scanned horizontal arms of the "E." Therefore if the character scanned is taller than normal, i.e., is taller than a standard character, the pattern of set stages in the 650 kHz. stacking register will tend to resemble the pattern produced in a synchronous frequency (700 kHz.) stacking register by a character of normal height, thereby effecting normalization of abnormally tall characters.

On the other hand, the pulses from the output of sampler 18 will progress further in the faster 750 kHz. stacking register 24*d* in a given period of time than they did in the 700 kHz. shift register. Also, since the 750 kHz. register also resamples the pulses of its input signal more stages of the 750 kHz. register 24*d* are set by each group of pulses than are set in the 700 or 650 kHz. shift registers. Thus the pattern of set stages in the 750 kHz. shift register will appear as in FIG. 6. The 750 kHz. shift register therefore effectively stores a signal representative of scansion of a vertically stretched version of the horizontal arms of the "E." Therefore if the character scanned is shorter than normal, the pattern of set stages in the 750 kHz. stacking register will tend to resemble the pattern produced in a synchronous frequency (700 kHz.) stacking register by a character of normal height, thereby normalizing abnormally short characters.

When the 700 kHz. registers 24*a* and 24*c* have been filled by the bits (pulses and spaces) produced by a single scanning stroke, the periodic transfer pulse on lead 26 will actuate gates 24*a'* to 24*d'*, causing the information in all of the stacking registers to be transferred simultaneously by parallel transfer to the initial stages of recognition register 28. After each time the information in the stacking registers is transferred to register 28, the scanning beam will be blanked and rapidly repositioned to begin another scan of the character. During such repositioning or flyback time, the stacking registers 24*a*–24*d* can be reset in response to the flyback signal in scanner 12, so that the next set of sampled bilevel signals from samplers 18 and 20 can be received by cleared registers.

Each binary signal transferred from a stacking register (e.g., register 24*d*) to the recognition register represents the scanner output signal produced in response to one scan stroke of the character, e.g., stroke 40 of FIG. 2. In the example given a group of 19 such binary signals represents the 19 strokes required for scansion of an entire character area.

Stacking register 24*d* transfers such binary signals in sequence to the same set of nonadjacent (four-apart) initial stages of recognition register 28, i.e., stages 1, 5, 9, etc., which make up the leftmost vertical column of stages. Each time recognition register 28 shifts, the binary signal will be transferred to a subsequent set of nonadjacent (four-apart) stages of register 28, e.g., the bits in stages 1, 5, 9, and 13, will be transferred to stages 2, 6, 10, and 14, respectively, so that each stage in the subsequent set of stages will be numbered one higher than its corresponding stage in the previous clock cycle interval.

After all 19 binary signals representing scansion of an entire character area are transferred to recognition register 28 from stacking register 24*d*, register 28 will have stored, in 19 sets of stages thereof, a group of 19 binary signals which together represent scansion of an entire character area. Every stage in these 19 sets of stages (except the first and last stages) will be four stages away from the next adjacent stage on either side thereof which is set by the output of register 24*d*.

Since the output stages of register 28 (i.e., the stages on the right-hand face of register 28, excluding the first column of stages) are four stages apart, a composite binary signal, consisting of the group of 19 binary signals which represent scansion of the entire character area, will appear at one instant at the output stages of register 28. In particular, during a period after the composite binary signal from stacking register 24*d* has been completely entered into register 28, the output stages of register 28 will be set according to the complete composite binary signal at every fourth cycle of operation of register 28.

In the intermediate three cycles between every such fourth cycle, the output stages of register 28 will be set in sequence according to the composite binary signals supplied by the other stacking registers 24*a*, 24*b*, and 24*c* in a manner similar to that in which the composite signal is supplied by stacking register 24*d*.

This is illustrated by FIG. 7, which shows patterns of set output stages of register 28 for successive cycles of operation of register 28. The first block shows how the output stages of register 28 will be set at one instant by the outputs of 700 kHz. stacking register 24*a*. The pattern of set stages physically resembles the scanned "E." One cycle later the outputs of register 28 will be set by the output of the 650 kHz. register 24*b*, as illustrated by the second block where the "E" is compressed vertically. One cycle later, the signal from the 700 kHz. shift register 24*c* will set the output stages of register 28 as also indicated in the first block where the "E" has a normal size. Still one cycle later the output of the 750 kHz. register 24*d* will set the output stages of register 28 as illustrated by last block in FIG. 7 where the "E" is lengthened vertically.

The views of FIG. 7 represent the positions of the character in register 28 at idealized times when each character is centered in the output stages, which is when the "E" mask of masks 30 (not illustrated) will provide a maximum output. However at all other times each character will progress through the output stages of the recognition register and occupy different positions therein, as shown in Chatten U.S. Pat. No. 3,233,973, granted Dec. 14, 1965.

Thus at certain instants, the recognition masks 30 receive complete character binary scan signals by parallel transfer from the output stages of register 28. The mask corresponding to the character scanned will produce an output, thereby identifying the character scanned. Through the use of plural different quantizers 14 and 16 and plural different stacking registers 24*a* to 24*d*, four binary scan signals, the level changes of which are determined by four different sets of criteria, can be derived from a single scan of a character. Through the use of a high-speed recognition register 28, these four composite binary scan signals, which effectively represent four different modes of scansion of a single character, can be presented to the recognition masks 30 in real time, i.e., within the same period of time in which the character is scanned once.

Since only one of the last-mentioned four composite binary scan signals is likely to resemble a standard composite binary signal, the mask corresponding to the character scanned usually will produce only one high-level output during those four cycles when each of the four composite binary signals is centered in the output stages of register 28, as shown in FIG. 7. During all other cycles, when the character is not physically centered in the output stages of register 28, the mask corresponding to the character scanned will produce only a low-level output.

While the foregoing disclosure contains many specificities, these should not be construed as limitations on the scope of the invention since many ramifications are possible within the ambit of the claims. For example although reflective scanning is shown, transmissive scanning (e.g., through a photographic negative) also is possible. Similarly a different scanning raster than the vertical lines of FIG. 2 may be used, e.g., horizontal lines, circular lines, etc. Moreover the signal supplied to the bilevel quantizers does not have to be a scanner output signal, but may be any character shape representative signal which can be transmitted, generated, or derived in a plurality of possible forms. The quantizers 14 and 16 can be trilevel or higher, instead of bilevel, in which case trinary or higher level stacking and recognition registers would be required. The samplers can be omitted if the stacking registers are able to accept nonsampled bilevel signals, i.e., of the type shown in FIG. 4. Appropriate delay lines can be used in lieu of the stacking and shift registers.

I claim:

1. In an optical character recognition system including:

means for electrooptically scanning an area with a series of advancing strokes occurring at a scanning frequency, thereby to produce an electrical output that is an analog representation of a character contained in said area, all of said area being scanned in a given time, means for converting said electrical output to at least one bilevel signal one level of which represents excursions in said electrical output at least equal to a predetermined threshold level and the other level of which represents excursions in said electrical output below said predetermined threshold level, means for sampling said bilevel signal at a rate that is a harmonic of said scanning frequency, and means for storing and supplying the output of said sampling means to classifying means arranged to indicate when said area being scanned produces a signal that differs by less than a predetermined value from one of a plurality of standard signals, the improvement wherein said means for storing and supplying comprises:

a. a plurality of stacking register means for accepting in parallel the samples of said bilevel signal, produced by said means for sampling, each stacking register means having sufficient capacity to accommodate the number of said bilevel signal samples produced during one of said scanning strokes, and means for actuating said stacking register means to produce parallel transfer of the signals therein in synchronism with said scanning, at least some of said plurality of stacking register means operating at respectively different fixed stacking frequencies; and b. shift register means for accepting the parallel outputs of said plurality of stacking register means and for supplying seriatim to said classifying means, by parallel transmission, said signals contained in each of said plurality of stacking register means, said shift register means having sufficient capacity for simultaneously storing the outputs generated during said given time, of all of said plurality of stacking register means.

2. A system according to claim 1, wherein said means for converting said electrical output comprises a plurality of bilevel quantizers for producing concurrently a plurality of bilevel signals, each of which is transmitted serially, one of said plurality of quantizers having said predetermined threshold level and another of said plurality of quantizers having a threshold level different from said predetermined threshold level, means for supplying said bilevel signal produced by said one quantizer to said means for sampling, means for sampling at said rate the one of said plurality of bilevel signals produced by said other quantizer, and means for supplying the respective output signals of said two means for sampling to respective inputs of different ones of said plurality of stacking registers.

3. A system according to claim 1, wherein said shift register means comprises a shift register of cascaded stages, a plurality of groups of initial stages thereof being connected to receive the outputs of said plurality of stacking register means, respectively, the stages of each of said groups of initial stages being nonadjacent, and a group of subsequent nonadjacent stages of said shift register means, larger than each of said groups of initial stages, being connected to supply said signals to said classifying means.

4. A system according to claim 2, wherein said shift register means comprises a shift register of cascaded stages, a plurality of groups of initial stages thereof being connected to receive the outputs of said plurality of stacking register means, respectively, the stages of each of said groups of initial stages being nonadjacent, and a group of subsequent nonadjacent stages of said shift register means, larger than each of said groups of initial stages, being connected to supply said signals to said classifying means.

5. The improvement of claim 1 wherein said means for sampling operates at the same frequency as one of said plurality of stacking register means.

* * * * *